US008326730B2

(12) United States Patent
Sweeney

(10) Patent No.: US 8,326,730 B2
(45) Date of Patent: Dec. 4, 2012

(54) SYSTEM AND METHOD OF CLEARING SERVICES FOR RISK MANAGEMENT TRADING

(75) Inventor: Francis Joseph Sweeney, Pennington, NJ (US)

(73) Assignee: Latex, Princeton, NJ (US)

( * ) Notice: Subject to any disclaimer, the term of this patent is extended or adjusted under 35 U.S.C. 154(b) by 2078 days.

(21) Appl. No.: 09/952,299

(22) Filed: Sep. 14, 2001

(65) Prior Publication Data
US 2004/0236698 A1      Nov. 25, 2004

Related U.S. Application Data

(63) Continuation-in-part of application No. 09/948,419, filed on Sep. 7, 2001.

(60) Provisional application No. 60/232,391, filed on Sep. 14, 2000.

(51) Int. Cl.
*G06Q 40/00* (2006.01)
(52) U.S. Cl. .................................. 705/37; 705/35; 705/4
(58) Field of Classification Search .................... 705/37, 705/35, 4
See application file for complete search history.

(56) References Cited

U.S. PATENT DOCUMENTS

| | | | | | |
|---|---|---|---|---|---|
| 5,704,045 | A | * | 12/1997 | King et al. | 705/35 |
| 6,058,379 | A | * | 5/2000 | Odom et al. | 705/37 |
| 6,067,528 | A | * | 5/2000 | Breed et al. | 705/26 |
| 6,317,727 | B1 | * | 11/2001 | May | 705/36 R |
| 6,321,212 | B1 | * | 11/2001 | Lange | 705/36 R |
| 6,594,635 | B1 | * | 7/2003 | Erlanger | 705/4 |
| 7,333,940 | B2 | * | 2/2008 | Best-Devereux | 705/4 |
| 7,565,302 | B2 | * | 7/2009 | Best-Devereux | 705/4 |

FOREIGN PATENT DOCUMENTS
WO      WO 9621903 A1 *   7/1996

OTHER PUBLICATIONS

CATEX pushes risk swaps into the info age, Susana Schwartz. Insurance & Technology. New York: May 1997. vol. 22, Iss. 5; p. 24, 1 pgs, available online @ http://proquest.umi.com, last accessed Nov. 26, 2007.*
Overview of CATEX, available online @ http://web.archive.org/web/19970712110116/www.catex.com/overview.htm, last accessed Nov. 26, 2007.*
Wayback machine results for http://catex.com/ last accessed Nov. 26, 2007.*
Reinsurance, definition from wikipedia.com, pp. 1-8, available online @ http://en.wikipedia.org/wiki/Reinsurance, last accessed Jan. 14, 2001.*
Who We Are—Reinsurance Association of America, pp. 1-3, available online @ http://www.reinsurance.org/i4a/pages/Index.cfm?pageID=3615, last accessed Jan. 14, 2001.*
eReinsure :: About Us, pp. 1-2, availble online @http://ereinsure.com/aboutus.html, last accessed Jan. 14, 2001.*
Goto, Shigeyuki, Study on the Interactive Approach between Insurance and Capital Markets for Catastrophe Risks, 19 pages, Working Paper Series Center on Japanese Economy and Business Columbia Business School Dec. 1997.*
The Marketcore Solution, available online at www.marketcore.com, last accessed Jan. 4, 2010.*

* cited by examiner

*Primary Examiner* — Mary Cheung
*Assistant Examiner* — Daniel L Greene

(57) ABSTRACT

A system for automated clearing and settlement of risk management transactions on an automated system used by a plurality of users provides electronic interaction between buyers and sellers and enables parties to make decisions concerning reinsurance products. The clearing system enables the transfer of premium and loss payments directly between risk-bearers or via brokers representing these risk-bearers.

13 Claims, 7 Drawing Sheets

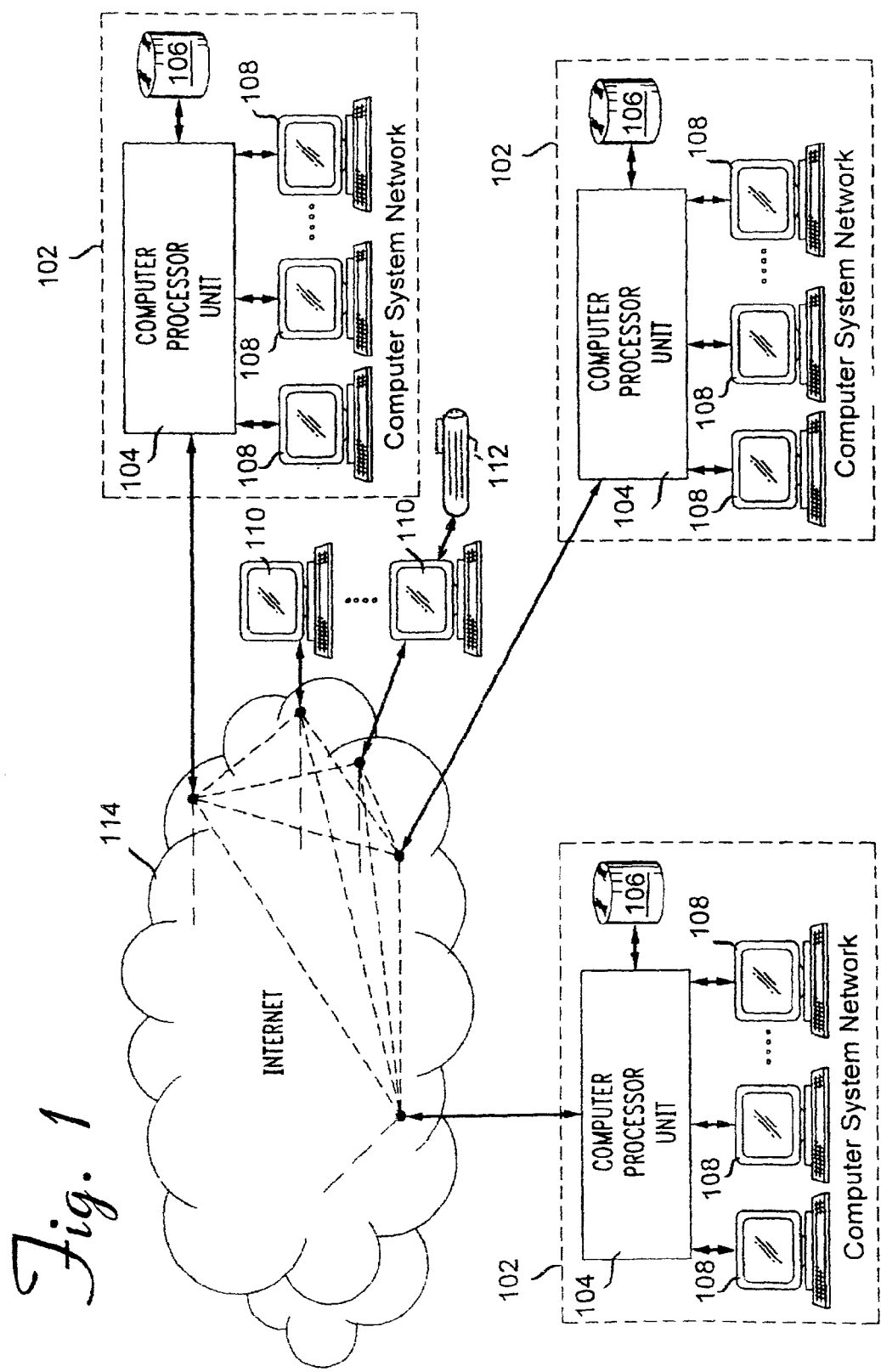

Fig. 2

Personal Filter

From Date [18 ▼] - [Feb ▼] - [1999]   GMT (Universal Time) — 204

To Date [18 ▼] - [Feb ▼] - [2001]   GMT (Universal Time)

Market Type — 206
- ☐ Property (Incl. P&C)
- ☐ Casualty Only
- ☐ Motor
- ☐ Aviation & Space
- ☐ Marine
- ☐ Energy
- ☐ Political Risk
- ☐ Credit & Financial
- ☐ Accident & Health
- ☐ Life & Annuities

Risk Instrument — 208
- ☐ FAC/Ppnl
- ☐ FAC/XL
- ☐ TR/QS
- ☐ TR/Splus
- ☐ TR/Risk XL
- ☐ TR/CAT XL
- ☐ TR/Occ XL
- ☐ TR/Clash XL
- ☐ TP/Agg XL
- ☐ TR/Stop Loss

Geographical Area — 210
- ☐ USA
- ☐ Canada
- ☐ Europe
- ☐ United Kingdom
- ☐ Asia
- ☐ Japan
- ☐ China
- ☐ Caribbean
- ☐ South America
- ☐ Africa

Fig. 3

Market Board

Tabs: All | My Company | My Postings | Private Network

| Own/Company PN | Posting # | Parent | Listing Title | Market Type | Interest | Risk Instrument | Scope | Posted |
|---|---|---|---|---|---|---|---|---|
| | 314 | | Florida Real Estate | Property (Incl. P&C) | Cede (Buy) | FAC/Ppnl | USA | 14-Mar-2000 |
| | 313 | | Earthquake only | Property (Incl. P&C) | Cede (Buy) | FAC/Ppnl | USA | 09-Mar-2000 |
| | 311 | ▲256 | Second Event $500 mi... | Property (Incl. P&C) | Cede (Buy) | IXD/ILW | Worldwide | 09-Mar-2000 |
| | 310 | ▲256 | Second Event $500 mi... | Property (Incl. P&C) | Cede (Buy) | IXD/ILW | Worldwide | 09-Mar-2000 |
| | 308 | | Catastrophe Excess o... | Property (Incl. P&C) | Cede (Buy) | TR/CAT XL | USA | 08-Mar-2000 |
| | 307 | | California Capacity | Property (Incl. P&C) | Assume (Sell) | IXD/ILW | USA | 07-Mar-2000 |
| | 303 | | Florida $20 Bln ILW | Property (Incl. P&C) | Cede (Buy) | IXD/ILW | USA | 07-Mar-2000 |
| | 302 | | Cheap Capacity for Sale | Property (Incl. P&C) | Assume (Sell) | IXD/ILW | USA | 06-Mar-2000 |
| | 301 | | qs test | Property (Incl. P&C) | Cede (Buy) | FAC/XL | USA | 06-Mar-2000 |
| | 297 | | XS CAT – 90% Placed ... | Property (Incl. P&C) | Cede (Buy) | TR/CAT XL | USA | 03-Mar-2000 |
| | 296 | | REVISED SATELLITE SE... | Aviation & Space | Cede (Buy) | FAC/Ppnl | Worldwide | 03-Mar-2000 |
| | 294 | | PA CATASTROPHE RETRO | Accident & Health | Cede (Buy) | TR/CAT XL | WW/ex USA | 03-Mar-2000 |
| | 291 | | Per Risk – Large Com... | Property (Incl. P&C) | Cede (Buy) | TR/Risk XL | Worldwide | 01-Mar-2000 |
| | 290 | | CA Workers' Compensa... | Accident & Health | Cede (Buy) | TR/Occ XL | USA | 01-Mar-2000 |
| | 281 | ▲263 | Large Aluminium Refi... | Property (Incl. P&C) | Cede (Buy) | FAC/Ppnl | Europe | 28-Feb-2000 |

Posting# 296    REVISED SATELLITE SECOND    328751    Drag center red bar
TLO OUT OF TWO                                       for entire posting view

Common Posting Elements

| | | | | | |
|---|---|---|---|---|---|
| Market Type | Aviation & Space | Scope | Worldwide | Activated | 03-Mar-2000 | Est Exposure | |
| Risk Instrument | FAC/Ppnl | Interest | Cede | Expires | 03-Apr-2000 | Currency | USD United States of America, Dollar |
| Exposure Measure | N/A | Participation | Willing to allow participation | Coverage Inception | 03-Mar-2000 | Term In Months | 23 |
| Retrocession | N/A | Coverage Expiration | 01-Feb-2002 | Risk Deposit Agreement | No | Lines Of Business | Space - Launch + Separation, |
| Financial Security | s&p A OR BETTER | | | | | | |
| Other Desc | TOTAL LOSS OF THE SECOND (IE. THE REPLACEMENT) SATELLITE, SUBJECT TO THE TOTAL LOSS OF THE FIRST SATELLITE, IN A SERIES OF TWO. EITHER 106.65% GROSS FLAT, OR ALTERNATIVELY 204.0% GROSS PLUS ADDITIONAL 18.0% IN THE EVENT OF THE FAILURE OF THE FIRST SATELLITE, THEREFORE MAKING A TOTAL PREMIUM OF 22% IF THE RISK ACTUALLY ATTACHES HEREUNDER. WE HAVE A MAJOR SATELLITE MARKET WHO IS VERY COMFORTABLE WITH THE ACTUAL RISK ITSELF, BUT THEY ARE NOW LOOKING FOR THIS CAPACITY BECAUSE THEY HAVE A LARGE ACCUMULATION ON THE SECOND SATELLITE. ON THE SECOND OPTION ABOVE, WE HAVE ALREADY PLACED $5.75 MILLION WITH LLOYDS AND ARE LOOKING FOR FURTHER SUPPORT, SLIP DETAILS AVAILABLE. | | | | | | |

Risk Instrument specific elements

| Subject Premium Measure | N/A | Ceding Commission Basis | N/A | Ceded Premium Measure | N/A |
|---|---|---|---|---|---|

No Communications

No Documents

*Fig. 6*

| | 604 | 602 | | |
|---|---|---|---|---|
| Logo or Letterhead of Preparer | | | | |
| From: | Best Broker Co. | To: | ABC Reinsurance Co | |

Agreement Information — 606

Statement Information  $   Periodic Statement — 608

Statement Details

| Account Name | Currency | Amount | C v. D. |
|---|---|---|---|
| Gross Ceded Premium | $ | 1000.00 | C |
| Ceding Commission | $ | 200.00 | D |
| Net Ceded Premium | $ | 800.00 | C |
| Losses Paid | $ | 500.00 | D |
| LAE Paid | $ | 100.00 | D |
| Net Due Reinsurer | $ | 200.00 | C |

— 610

Comments — 612

Payment Instructions   Check   Wire Transfer

*Please remit payment to:* — 614

Fig. 7

POSTING TEMPLATE (Visible to Market or Private Network) — 702

Standard System-wide Data Fields (e.g., Posting Date, Market Type, etc.)

Data Fields for Specific Posting Templates (Fields Varying by Business Line & Instrument Type)
- Mandatory v. optional fields
- Elective fields in posting templates
- Custom fields in posting templates

TRANSACTION CONTROL & REPORTING (Visible to Transaction Controller & Designated Transacting Parties)

Name of Ceding Company
Name of Broker
Name of Definitive Slip or Contract — [Hyperlink to Definitive Slip or Contract] — 706

| Order Name of Transacting Party | | 1st Layer<br>Layer Structure: $2m xs $1m<br>Layer Price: 6.5% | | | | 2nd Layer<br>Layer Structure: $2m xs $3m<br>Layer Price: 4.5% | | | | 708 |
|---|---|---|---|---|---|---|---|---|---|---|
| | | Price ($ or %) | Participation % | Confirmation Procedure | | Price ($ or %) | Participation % | Confirmation Procedure | Last Update | Viewing Privileges |
| Co-Participation % (i.e., co-reinsurance %) | | | | | | | | | | |
| c/o Jack Doe | Current Program | | | | | | | | | |
| | Proposed by Ceding Co | | | | | | | | | |
| | Contact | John Doe | | | | Financial | A M Best AAA-rated | | | |
| 1 ABC Re | Current Program | 9000 USD | 10.000% | N/A | | 9000 USD | 10.000% | N/A | N/A | own only |
| | Entry by Reinsurer | 1000 USD | 15.000% | s t off-line confirm | | 1000 USD | 15.000% | s t off-line confirm | 3-Mar-00 | |
| | Entry by Ceding Co | 8000 USD | 20.000% | s t on-line confirm | | 8000 USD | 20.000% | s t on-line confirm | 1-Mar-00 | N/A |
| | E-Mail | | | | | | | | | |
| | Contact | Jane Doe | | | | Financial | A M Best BBB-rated | | | |
| 2 ECA Re | Current Program | | 0.000% | decline | | | | | 2-Mar-00 | none |
| | Entry by Reinsurer | | | | | | | | | |
| | Entry by Ceding Co | | | | | | | | | N/A |
| | E-Mail | | | | | | | | | |
| | Contact | Fred Doe | | | | Financial | A M Best AA-rated | | | |
| 3 CBA Re | Current Program | | | | | | | | | none |
| | Entry by Reinsurer | | | | | | | | | |
| | Entry by Ceding Co | | | | | | | | | N/A |
| | E-Mail | | | | | | | | | |
| Total | Current Program | | | | | | | | | |
| | Entry by Reinsurer | | | | | | | | | |
| | Entry by Ceding Co | | | | | | | | | |

704

SYSTEM AND METHOD OF CLEARING SERVICES FOR RISK MANAGEMENT TRADING

CROSS REFERENCES TO RELATED APPLICATIONS

This application is a continuation in part of co-pending U.S. patent application Ser. No. 09/948,419, entitled System And Method Of Automated Brokerage For Risk Management Services And Products, filed on Sep. 7, 2001 and claims the benefit of U.S. Provisional patent application Ser. No. 60/232,391, entitled System And Method Of Clearing Services For Risk Management Trading filed on Sep. 14, 2000.

FIELD OF THE INVENTION

This invention relates to network-based communication systems and more particularly to the management of information about risk management products over a communication network.

BACKGROUND OF THE INVENTION

Insurance provides a method of sharing risk. Insurers often seek to share their risk through reinsurers, thus reducing the impact of a single catastrophic event on their financial stability. Buyers and sellers of reinsurance in today's market look to intermediaries and financial services companies to offer services including providing brokerage services.

Reinsurance coverage is typically arranged for the various lines of property casualty insurance including business insurance, commercial auto, aviation, energy, financial guarantee, ocean marine, inland marine, surety, professional liability, and workers' compensation, among others.

The business relationship between a reinsurance seller and a reinsurance buyer has long been controlled by brokers, dealing through personal contacts, maintaining tight control of financial and business information. Brokers typically charge a fee based on a percentage of the reinsurance cost, such as fifteen percent. The nature of reinsurance business practices and customs make an open brokerage model or open market exchange undesirable. There is a need to be able to automate the buying and selling of reinsurance products while maintaining anonymity and confidentiality. It would be desirable to provide powerful integrated searching tools, information retrieval mechanisms, vendor request mechanisms and management tools that will assist risk managers in making and managing their procurement decisions.

SUMMARY OF THE INVENTION

The present invention is an integrated management system for risk management trade clearing, which enables the transfer of premium and loss payments directly between risk-bearers or via brokers representing these risk-bearers. A dynamic interaction between buyers and sellers, which maintains confidentiality, enables efficient decisions to be made concerning reinsurance products.

BRIEF DESCRIPTION OF THE DRAWINGS

A more complete understanding of the present invention may be obtained from consideration of the following description in conjunction with the drawing in which:

FIG. 1 is a stylized overview of interconnected computer system networks;

FIG. 2 is an exemplary user screen displaying representative items used for filtering;

FIG. 3 is an exemplary Market Board display;

FIG. 4 is an exemplary display of the detailed posting and communication information for a specific posting;

FIG. 6 is an exemplary electronic account statement; and,

FIG. 7 is an exemplary display of transaction control and reporting.

DETAILED DESCRIPTION OF VARIOUS ILLUSTRATIVE EMBODIMENTS

Figure 5:
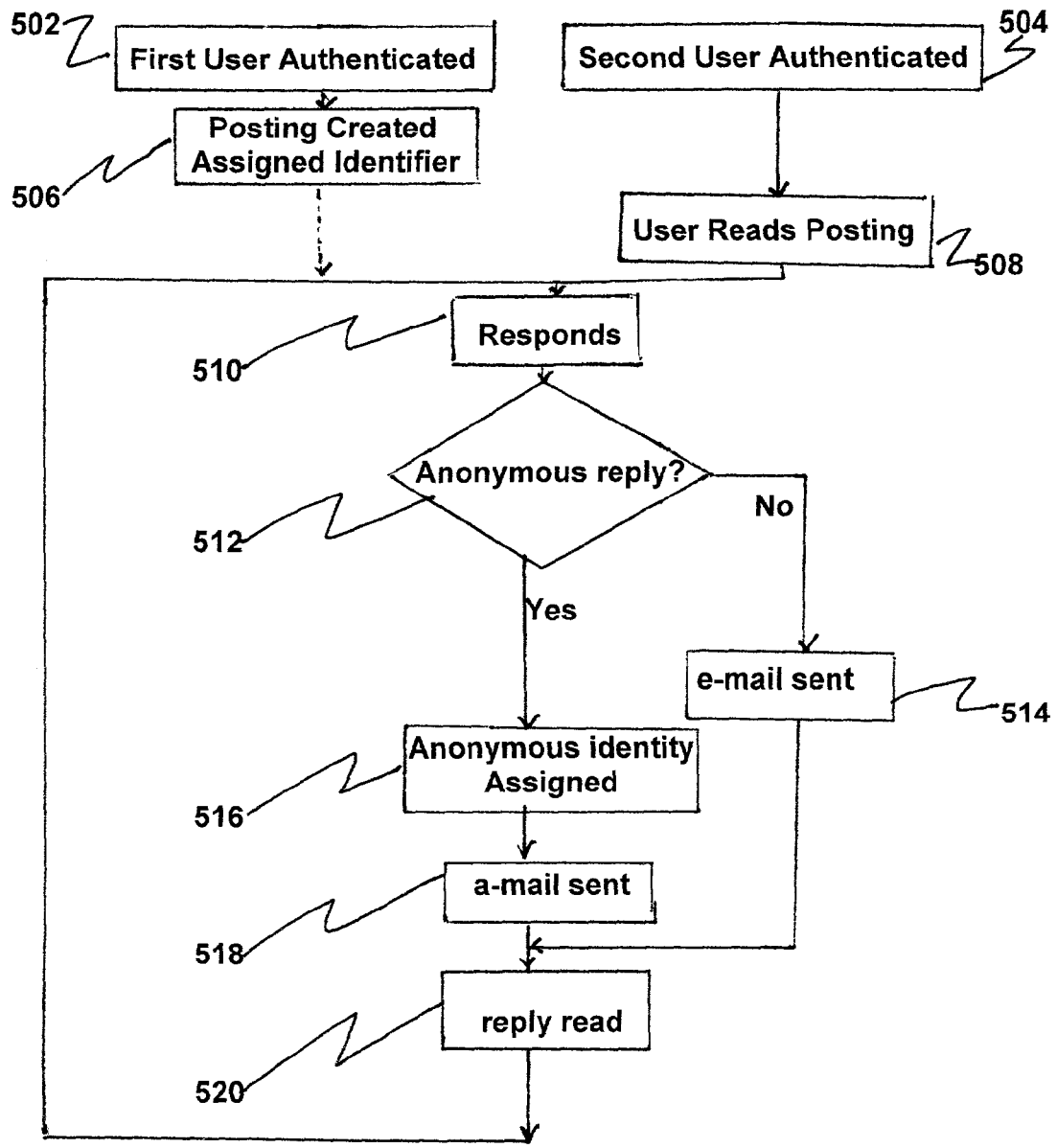
FIG. 5 is a block diagram of the sequence of steps that may occur during use of the system.

Although the present invention is particularly well suited for brokerage of reinsurance services and products and shall be so described, the present invention is equally well suited for use in the brokerage of other services and products, which require similar confidentiality and anonymity.

Although the present invention, integrated management system for risk management trade clearing (risk trade clearing system), is particularly well suited for use with the Internet and shall be so described, the present invention is equally well suited for use in other network communication systems including but not limited to an Intranet, extranet, Interactive television (iTV) and similar interactive networked communication systems.

Although the risk trade clearing system is particularly well suited for implementation as an independent software systems and shall be so described, the present invention is equally well suited for implementation as a functional/library module, an applet, a plug in software application, as a device plug in, and in a microchip implementation.

The Internet is a worldwide system of computer networks—a network of networks in which users at one computer can obtain information from any other computer (and communicate with users of the other computers). The Internet was conceived by the Advanced Research Projects Agency (ARPA) of the U.S. government in 1969 and was first known as the ARPANet. The original aim was to create a network that would allow users of a research computer at one university to be able to communicate with research computers at other universities. A key design element of ARPANet that, because messages could be routed or rerouted in more than one direction during the course of a communication link, the network could continue to function even if parts of it were destroyed such as by a military attack or natural disaster.

The Internet has evolved into a public, cooperative, and self-sustaining facility accessible to hundreds of millions of people worldwide. Physically, the Internet uses a portion of the total resources of the currently existing public telecommunication networks. Technically, what distinguishes the Internet is its use of a set of protocols called Transmission Control Protocol/Internet Protocol (TCP/IP).

For many Internet users, electronic mail (e-mail) has essentially all but replaced the Postal Service for short written transactions. E-mail is the most widely used application on the Internet. Live "conversations" can be carried on with other computer users, using Internet Relay Chat (IRC) and various Instant Messenger (IM) applications. More recently, Internet telephony hardware and software allows real-time voice conversations.

The most widely used part of the Internet is the World Wide Web (often abbreviated "WWW" or simply called "the Web"). The most outstanding feature of the Web is its extensive use of hypertext, which is a method of instant cross-referencing. In most Web sites, certain words or phrases appear in text of a different color than the rest; often this text is also underlined. When one of these words or phrases is selected, it's a hyperlink, transferring the user to the site or page that is relevant to this word or phrase. Sometimes there are buttons, images, or portions of images that are "clickable" which act as a hypertext link when selected. Using the Web provides access to millions of pages of information. Web "surfing" is done with a Web browser; the most popular of which presently are Netscape Navigator and Microsoft Internet Explorer. The appearance of a particular Web site may vary slightly depending on the particular browser used. Recent versions of browsers have plug-ins, which provide animation, virtual reality, sound, and music. Because the Internet evolved from the ARPAnet, a research experiment that supported the exchange of data between government contractors and (often academic) researchers, an on-line culture developed that is alien to the corporate business world. Although not designed to make commercialization easy, commercial publishing and various forms of e-commerce have rapidly evolved which over the Internet. In part it is the very ease that anyone can publish a document that is accessible by a large number of people that makes electronic publishing attractive. Setting up e-commerce provides low overhead while reaching a worldwide market 24 hours a day. The growth and popularity of the Internet is providing new opportunities for commercialization including but not limited to Web sites driven by electronic commerce, ad revenue, branding, database transactions, and intranet/extranet applications.

Domain names direct where e-mail is sent, files are found, and computer resources are located. They are used when accessing information on the Web or connecting to other computers through Telnet. Internet users enter the domain name, which is automatically converted to the Internet Protocol address by the Domain Name System (DNS).

E-mail was one of the first services developed on the Internet. Today, e-mail is an important service on any computer network, not just the Internet. E-mail involves sending a message from one computer account to another computer account. E-mail is used to send textual information as well as files, including graphic files, executable files, word processing and other files. E-mail is becoming a popular way to conduct business over long distances. Using e-mail to contact a business associate can be faster than using a voice telephone, because the recipient can read it at a convenient time, and the sender can include as much information as needed to explain the situation.

File Transfer Protocol (FTP), a standard Internet protocol, is the simplest way to exchange files between computers on the Internet. Like the Hypertext Transfer Protocol (HTTP), which transfers displayable Web pages and related files, and the Simple Mail Transfer Protocol (SMTP), which transfers e-mail, FTP is an application protocol that uses the Internet's TCP/IP protocols. FTP is commonly used to transfer Web page files from their creator to the computer that acts as their server for everyone on the Internet. It's also commonly used to download programs and other files to your computer from other servers.

On-line commerce, or "e-commerce", uses the Internet, of which the Web is a part, to transfer large amounts of information about numerous goods and services in exchange for payment or customer data needed to facilitate payment. Potential customers can supply company with shipping and invoicing information without having to tie up sales staff. The convenience offered to the customer is that they don't have to drive around town all day looking for the product they want.

E-commerce businesses, while much talked about are still under going a shake out, changing their very methods of operations. Initially, web sites were simply information sites—on line advertisements and brochures. Even as customers flocked to web sites to make on line purchases, it became doubtful if most web based businesses could even turn a profit. The various e-commerce web sites fall into one of two groups: a pure web based business; or a brick-and-mortar business with an on-line presence. But any business selling goods requires a distribution network. In fact, the largest costs for e-businesses are typically warehouses and the associated distribution of products. Without innovative alternatives, the only real chance to survive is to have a strong established distribution network or to operate in a unique niche market.

Internet access through digital cell phones has gotten a lot of publicity recently. Unfortunately, most users of wireless application protocol (WAP) are frustrated by the limitations of calling up the World Wide Web on their cell phones: Anything more complex than a simple weather report, stock report or sports score is very awkward and time consuming to obtain.

A serious challenge to traditional long distance telephone service has evolved using the Internet. A number of new software and hardware products allow the use of a Voice over Internet Protocol (VoIP). The systems are now designed to be used with a normal telephone, eliminating the earlier requirements that users be setting at a computer connected to the Internet. Internet users now can get sound quality near to that of a traditional switched telephone.

Referring to FIG. 1 there is shown a stylized overview of interconnected computer system networks. Each computer system network 102 contains a corresponding local computer processor unit 104, which are coupled to a corresponding local data storage unit 106 and network users 108. The local computer processor units 104 are selectively coupled to a plurality of users 110 through the Internet 114. Each of the plurality of users 110 may have various devices connected to their local computer systems such as scanners, bar code readers, RFID detectors and other interface devices 112. A user 110 locates and selects (such as by clicking with a mouse) a particular Web page, the content of which is located on the local data storage unit 106 of the computer system network 102, to access the content of the Web page. The Web page may contain links to other computer systems and other Web pages.

The risk trade clearing system is a web-based business-to-business solution that streamlines information and commerce among all members of the reinsurance industry while maintaining confidentiality and anonymity. Combining the essential elements of content, community, commerce and workflow processing, the present invention, system and method of automated brokerage for risk management services and products, provides robust portals that make it possible for hospitals, buyers and sellers of reinsurance products and services to interact in real time over the Internet.

The risk trade clearing system provides a business-to-business e-commerce solution for risk management. The risk trade clearing system is a low-cost global marketing tool, which empowers the end user to efficiently manage risk by creating new and speedier channels of distribution.

Users of the risk trade clearing system, whether they are from the risk bearing, brokering or risk management community access the live trading system at a predefined URL over the Internet. Users are able to organize and manage their risk portfolio by moving between their personal board showing deals they are participating in to the market board of all current live deals. By eliminating administrative bottlenecks and moving data from in-boxes to digital pipelines, the present invention reduces transaction costs, solidifies relationships with existing customers and attracts new ones.

The risk trade clearing system is far more than simply a bulletin board for those interested in trading and managing risk—it is an integrated Internet browser—based trading exchange system. The risk trade clearing system can be deployed to all end-users in an enterprise, enhancing productivity. The communication, document handling, tracking and negotiation tools embedded in the system and method allow users to complete all manner of transactions efficiently and effectively.

The risk trade clearing system is a horizontal trading platform linking other world markets and individual vertical electronic distribution networks, which is able to offer an extensive distribution channel for spreading risk and an industry-wide forum to facilitate the development of relationships, products and transactions.

The risk trade clearing system offers a number of key business benefits to the risk bearing community including tools to share information, negotiate terms and complete transactions efficiently and effectively. Given the above efficiencies, markets may adjust their risk portfolio throughout the year as market or pricing conditions alter. A global open posting board gives parties access to deals they might otherwise not have seen. Users are able to form relationships with new business partners around the world, including direct relationships with corporate risk managers and other ceding companies. Parties are able to complete real-time transactions reacting to political, economic or climatic events, 24 hours a day, 7 days a week.

The risk trade clearing system provides enhanced functionality to allow users to market individual deals through a private network, linking in business partners who are not system subscribers to utilize the efficiencies of the trading system for individual deals.

Matching tools within the present invention allow underwriters to specify precisely the types of deal they are interested in pursuing. The risk trade clearing system will then automatically match the underwriter's requirements to all new deals on the global posting board and alert them accordingly.

The risk trade clearing system can be implemented through a variety of software/computer tools, which are known to those, skilled in the art. The architecture and software development tools which are used to implement a particular embodiment of the present invention, system and method of automated brokerage for risk management services and products may include client/server programming language such as JAVA, HTML, XML, PERL, data base products such as Oracle, SQL Server, etc. The specific choice of the architecture, hardware and communication tools can easily be made by one skilled in the art of software development.

The risk trade clearing system is a Web-enabled technology where all users are able to access all system functionality using Internet connections. Any software, such as plug-ins required by the user, is made available for download from the web site or a link provided by the web site. The risk trade clearing system resides on a secure Web site which is protected by user passwords, encryption and any other security systems necessary to prevent any unauthorized access to the Web site and the associated data. The risk trade clearing system includes automatic, real-time updates of using auto-refresh functionality, "push" technology, intelligent agents, or similar means. The updates avoid any interference with ongoing system use by traders. The system includes a system clock showing the correct time in GMT or other selected time zone (e.g., EST), which enables users to convert between time zones to determine time in other world regions or ascertain overlapping business hours between major reinsurance markets.

The risk trade clearing system includes on-line registration forms enabling companies and users to enter information requested as part of the subscription process. Company set-up information shall include company name; company type (e.g., commercial risk-bearer, broker, corporate self-insured, etc.); company administrative information (i.e., mail address; billing address, e-mail address); and other informational items specified. User set-up information shall include user name; user administrative information (i.e., mail address, telephone number, e-mail, etc.); user trading privileges (i.e., view; post; confirm; change authorities of other users); security information (i.e., passwords, Q&A to obtain forgotten password); and other informational items specified. This semi-automated process shall allow an operator of the system to make rapid determinations on subscription applications and other decisions relating to company participation in the market (i.e., the Subscription Agreement would be executed separately off-line, although this document could be made available electronically as well). Information collected at the registration stage and routed to an Administration Data Base will also be used for general administrative purposes (e.g., billing, marketing, etc.) and certain items (e.g., company class, market maker status) may be used to delimit company/user trading privileges or aid in distribution/filtering of postings and communications in the marketplace.

Exemplary embodiments of this feature follows. Initially, a non-subscribing company (i.e., including its authorized users) completes the on-line registration form expressing interest in the Subscription; this information is routed to the Administration database. Following any necessary re-entry or editing of information, Administration approves/disapproves the company/user registrations, and if approved, the Subscriber and its users are given full trading privileges on the Trading System.

A non-subscribing company completes the on-line registration form expressing interest in a Buyer License; this information is routed to the Administration database. Following any necessary re-entry or editing of information, Administration approves/disapproves the Buyer License. If approved, the Buyer is given access to entire Market Board (i.e., it receives all postings), but the Posting template automatically restricts transaction interest to "cede" only; the Buyer cannot indicate "assume" or "swap" risk as the "transaction interest" on a Posting template.

A non-subscribing company completes the on-line registration form expressing interest in using the Post-A-Risk facility; this information is routed to the Administration database. Administration then approves/disapproves Post-A-Risk the registration. If approved to post the risk, the Risk Poster is given access only to the Posting template and the Private Deal Board (i.e., including all communication facilities needed to conclude the deal) showing only the posting originated the Risk Poster, although Administration shall have discretion to grant access to the Market Board as a means to encourage full subscription by the Risk Poster.

A Subscriber completes the on-line registration form expressing interest in acting as Market Maker; this information is routed to the Administration database. Administration then approves/disapproves the Market Maker registration. If other Subscribers elect to use the Market Maker option specified on their Posting template, these designated postings are routed initially to any approved Market Makers for a specified time period (e.g., 72 hours) prior to their market-wide distribution.

A Subscriber completes the on-line registration form expressing interest in operating either a Continuous (i.e., enabling multiple deals over an extended time period) or a Temporary Private Network (i.e., enabling a single deal over a specified time period). This registration will also identify other non-subscribing trading parties to be enrolled in the Private Network, and any additional registration required from these non-subscribing parties is entered by either the Subscriber or these parties. This registration information is routed to the Administration database. Administration approves/disapproves Private Network registration and assigns appropriate passwords/security clearances for the Network. Enrollees are given access only to postings distributed via the Private Network.

Each Subscriber completes the on-line registration form indicating its company name and company type (e.g., commercial risk-bearer, broker, etc.). Administration implements market guidelines allowing each Subscriber to distribute its postings to other subscribing companies on a selective basis. Under these guidelines, the Subscriber uses the Posting template to include/exclude certain company types and include/exclude certain companies by name. These postings appear solely on the screens of those companies authorized to view the postings.

The risk trade clearing system provides Administration with suitable, real-time access to review, approve/disapprove and edit all information compiled in company/user registration system.

The risk trade clearing system provides Administration with suitable access to monitor Trading System activity and communications on a real-time basis. Examples of such monitoring functions include access to and monitoring of user log-ons/log-offs, usage of system applications, on-line communications (i.e., including O-T-B Postings and Responses; A-Mails and Aliases (i.e., ability to associate aliases with company/user names); Name Exchanges; E-Mails; Document Center; etc.) and Trade Reports. The software includes such sorting/filtering functions as may be needed to support these monitoring functions in light of the anticipated usage rates for the system.

The risk trade clearing system enables Administration to undertake the automatic transmittal of notices to users as may be appropriate to assist in the collection of all trading fees owed to the operator or perform other critical administrative functions. In particular, the risk trade clearing system includes a function enabling the transmittal of a notice/certification following a Name Exchange between transacting parties.

The risk trade clearing system enables the operator to transfer limited administrative functions (e.g., review of log-ons/log-offs) to subscribing companies to support their ability to monitor and supervise their own system users.

User Profile Screens

The risk trade clearing system enables users to sort/filter postings and trades to allow their selective display based upon market type, instrument type or other parameters specified in posting templates or trade reports. Referring to FIG. 2 there is shown an exemplary user screen 202 displaying representative items used for filtering. A date range 204 can be used to narrow the postings being viewed along with market type 206, risk instrument 208 and geographical area 210. The risk trade clearing system also enables the distribution of alerts for new postings, trade reports or communications meeting pre-selected criteria (e.g., new Casualty postings; new Property ILW trades; all new communications relating to Deal #591). These alerts shall include a hot-link to the item requested.

Market Board and Private Deal Board

Referring to FIG. 3 there is shown an exemplary Market Board display 302. The display contains all postings (i.e., those distributed to the entire market) showing selected fields common to all postings (e.g., posting number 306, parent posting 308, listing title 310, market type 312, transaction interest 314, risk instrument 316, geographical scope 318, posting date 320, as well as other identifiers 304.). The Market Board includes standardized sorting functions as tabs or buttons (e.g., Market tabs, FAC Board, ILW Board, Weather Board) and more specialized search functions (e.g., all postings within past 30 days). The Market Board includes appropriate markings to identify and highlight each user's own postings (i.e., user originated or responded to these deals); any new postings on the Board; any significant responses to postings (i.e., as measured by # hits, off-board communications via A-Mail/E-Mail or other suitable parameters). User should be able to click on a "More Details" field under each posting (such as posting number 296) to go to the detailed posting and communication information for a specific posting 402 shown in FIG. 4.

The Trading System includes a means by which a user may elect to adopt a Trading Screen, including, if practicable, a real-time version of the Market Board, as the user's desktop screen saver. The Trading System provides a user-friendly set-up feature enabling each user to download any additional system required to install and update the screen saver device.

The risk trade clearing system provides clearly marked functionality enabling users to originate postings/deals from either the Market Board or the Private Deal Board. The posting procedure provides completion of a posting template and distribution of any supporting documents (e.g., slip, underwriting submission, etc.) via the Document Center. Each new posting shall be assigned a unique posting # by the system. Posting data from certain posting fields (i.e., those selected by Administration) shall be automatically exported to the "ticker" once a posting has been submitted by a user. A posting originated from within a user's company should be clearly marked.

The risk trade clearing system provides a communication functionality enabling users to engage in direct, anonymous messaging and communication (i.e., including documents and other attachments) between one another. The A-Mail (anonymous mail) function provides the assignment of random numeric/alphabetic aliases (i.e., aliases will not be selected by users) to differentiate multiple traders involved in a particular deal. This function shall also include selected standard E-Mail features as may be determined by the system operator. A-Mail messages are captured on the operator's servers to ensure immediate, reliable delivery, but they are also transferable via corporate e-mail outlets to provide user convenience. The risk trade clearing system provides a notice/alert when an A-Mail is received for specific deal ("You have an A-Mail relating to Deal 591 . . . ") with a hot-link to the A-Mail. Original posting information is visible when composing an A-Mail.

Referring to FIG. 5 there is shown one embodiment of the sequence of steps that may occur during use of the system. A first user is authenticated 502 and a second user is authenticated 504 for accessing the risk trade clearing system. The first authenticated user can create a posting 506 which is assigned a posting identifier. The second authenticated user can read the postings 508. A response can be generated to a communication or a message in step 510. The authenticated user can select if the response is to be anonymous in step 512. If the response is not anonymous, then a standard e-mail is sent in step 514. If the response is to be anonymous, then an anonymous identity is assigned in step 516. The anonymous message is sent in step 518, having all of the standard e-mail features such as the ability to make attachments and send copies. The reply is read in step 520.

The risk trade clearing system posting and a-mail sequence is designed to ensure that anonymity of the transacting parties; this approach assists the system operator in keeping transactions on the system. The system benefits from the inclusion of filtering system that could track any Postings, Responses or A-Mail communications that include proper names, telephone numbers, fax numbers, e-mails or other means to circumvent the use of the Name Exchange facility for cross-identification of interested parties.

The risk trade clearing system provides communication functionality enabling users with a shared interest in a particular deal to engage in a simultaneous exchange of their company names/identities. Name exchanges are captured on the system operator's servers to ensure immediate, reliable delivery, but they should also be transferable via corporate e-mail outlets to provide user convenience. The risk trade clearing system provides a notice/alert when a Name Exchange is received for specific deal ("You have received a Name Exchange request relating to Deal 591 . . . ") with a hot-link to the Name Exchange. Following the name exchange, an option to include the corporate logo in subsequent communications is included.

The risk trade clearing system provides a digital signature functionality enabling the electronic binding and authorization of individual deals and/or participations on deals by transacting parties. This functionality provides appropriate password protection and/or other security measures to ensure the strict integrity of the authorization process.

The risk trade clearing system provides suitable auction/syndication engines to facilitate the conclusion of one-to-one or one-to-many deals among transacting parties on the system.

The risk trade clearing system enables users to elect to participate in a real-time on-line trader directory identifying the set of traders logged on to the system at any particular time. This directory assists users in making use of real-time communication facilities (e.g., real-time text dialog) without being required to make a prior appointment with other participating traders.

The risk trade clearing system provides a communication functionality enabling the transmission of real-time text dialog and whiteboard among transacting parties. The risk trade clearing system provides a user-friendly set-up procedure to coordinate and initiate each planned session. The contents of each dialog/whiteboard session should be automatically saved as a file to the Communications In-box and Trade Archive.

The application and system software can be implemented in a variety of programming languages and tools that are known to those skilled in the art of on line software development. Particular selections of programming languages are development tools are a matter of choice dependent on existing hardware, software and architectural structures. The choices are readily apparent to those skilled in the art on line software development.

The present invention, risk trade clearing system, will facilitate the conclusion of more transactions. The actual clearing is elective for any system transaction. The clearing system enables the transfer of premium and loss payments directly between risk-bearers or via brokers representing these risk-bearers. Clearing system also enables companies to manage financial data for off-line transactions.

Incorporation of net accounting procedures enables companies to manage and monitor their credit exposure with respect to their counterparties. Improved portability" of transaction data provides real-time "snap-shot" of transaction data and facilitate risk trading in the retro/secondary market.

Electronic forms used by the clearing process. These forms supply information on the transacting parties and specify clearing guidelines and instructions for each individual transaction. The system core includes a series of clearing forms that characterize and record each payment or notice exchanged by the transacting parties. The system includes electronic bill presentment and payment (EBPP) component to enable payment via the clearing system.

The system supports international funds transfer, including FOREX settlement where parties are transacting in multiple currencies. The system maintains a detailed transaction ledger and other financial reports for each transaction cleared through the Trading System facility.

The present invention is an online clearing and settlement system for numerous cross-domain systems. The clearing and settlement system enables transfer of premium and loss payments directly between the transacting risk-bearers or alternatively via their broker(s). The system contains electronic statement presentation and payment facilities, including the ability to offset two-way fund flows and incorporate net accounting procedures. Accounting data automatically compiled in the system's Transaction Ledger will assist underwriters and brokers in analyzing the performance of their current programs at the time they seek to renew this business on any cross domain system.

The system enables online payments between transacting parties. All components of the clearing system are designed to ease integration to company accounting and "back-office" systems using XML and other common technology.

In view of the foregoing description, numerous modifications and alternative embodiments of the invention will be apparent to those skilled in the art. It should be clearly understood that the particular exemplary computer code can be implemented in a variety of ways in a variety of languages, which are equally well suited for a variety of hardware platforms. Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claim, is reserved.

I claim:

1. A method for a web-based system of placement, binding, settlement and claims payment of reinsurance and commercial insurance transactions between parties comprising:
   authenticating access of reinsurance brokers and/or reinsurers to an integrated management and clearance system,
   wherein the integrated management and clearance system;
   provides templates to the reinsurance brokers and/or reinsurers to enter data about risk(s) to be insured or reinsured;
   enables management of deal negotiations of said risk(s) with an on-line price quote board; wherein the on-line price quote board records an audit function of agreed to premium and participation levels by the reinsurance brokers and/or reinsurers of each risk(s) including recording prebinding negotiated indications of premium and participation levels;

receives acceptance of final terms from all parties, creates a binding contract from the on-line price quote board data, wherein said contract includes terms for the settlement and payment of claims, determines the assigned responsibilities for each reinsurer and issues claim advice notices per a participation ratio of each reinsurer as outlined by the contract, and provides settlement of premiums and claims among commercial insurers and reinsurers while maintaining regulatory fiduciary requirements.

2. The method of claim 1 further comprising wherein once the contract is bound, the integrated management and clearance system automatically generates premium statements reflecting the terms agreed to in the on-line price quote board.

3. The method of claim 2 further comprising wherein creating premium statements causes the creation of ledger entries assigning the respective parties a debit(s) or credit(s).

4. The method of claim 1 further comprising wherein the integrated management and clearance system records incoming payment(s) from parties to a reinsurance broker(s), and wherein the reinsurance broker(s) apply such payments, in part or in whole, to offset debits that have been created by generation of premium or claim statements.

5. The method of claim 1 further comprising wherein the integrated management and clearance system records incoming information pertaining to a claim loss by adding the incoming information to a number of claims notice templates resident on the integrated management and clearance system.

6. The method of claim 5 further comprising wherein entry of a claim notice results in the integrated management and clearance system creating a claim workspace that assists the reinsurance brokers in matching the claim with a correlating bound contract.

7. The method of claim 6 further comprising wherein the claim workspace allows the reinsurance brokers to apply incoming payment(s) to a claim and automatically calculates the remaining responsibility of a reinsurer on a specific claim.

8. The method of claim 7 further comprising wherein at each application of payment(s) to an outstanding balance of a claim, the integrated management and clearance system automatically generates a claims statement and revises a debit and credit ledger of the transaction.

9. The method of claim 8 further comprising aggregating the debit and credit ledgers of a plurality of transactions of a single party with multiple premium and claim statement activity or against all parties with premium and claim activity, and creating a balance sheet of the overall integrated management and clearance system activity of the aggregated debit and credit ledgers for each party or parties.

10. The method of claim 1 further comprising automatically uploading disparately formatted data pertaining to risks which are the subject of coverage agreed to on the integrated management and clearance system and transforming the disparately formatted data into homogenous data residing on the integrated management and clearance system.

11. The method of claim 1 wherein the data comprises one of the address or location of the risk(s), construction type, year built, distance from coast, distance from firebox, distance from police station, and the integrated management and clearance system creates a policy loss ratio by aggregating individual premium and claim information for each particular risk(s) location.

12. The method of claim 1 wherein a generation of contracts, claim payment notices, placement slips, clause information and contract endorsements are performed by the integrated management and clearance system subsequent to the entering of values in data fields.

13. The method of claim 1 further comprising, selecting data fields over a chronological time period and creating reports such as, collected premiums, paid claims, and loss ratios based upon said selected data fields and chronological time period.

* * * * *

UNITED STATES PATENT AND TRADEMARK OFFICE
CERTIFICATE OF CORRECTION

PATENT NO. : 8,326,730 B2  
APPLICATION NO. : 09/952299  
DATED : December 4, 2012  
INVENTOR(S) : Francis Joseph Sweeney Page 1 of 1

It is certified that error appears in the above-identified patent and that said Letters Patent is hereby corrected as shown below:

Title page, item [73] Assignee should read: --CATEX--

Signed and Sealed this  
Twenty-second Day of January, 2013

David J. Kappos  
*Director of the United States Patent and Trademark Office*